United States Patent Office 3,819,603
Patented June 25, 1974

---

3,819,603
SULFAGUANIDINES
Tsung-Ying Shen, Westfield, Michael W. Fordice, Cranford, William V. Ruyle, Scotch Plains, and Norman P. Jensen, Watchung, N.J., assignors to Merck & Co., Inc., Rahway, N.J.
No Drawing. Continuation-in-part of abandoned application Ser. No. 51,341, June 30, 1970. This application Feb. 16, 1971, Ser. No. 115,731
Int. Cl. C07d 31/48, 91/36, 63/12
U.S. Cl. 260—239.6
7 Claims

ABSTRACT OF THE DISCLOSURE

Novel sulfaguanidines are useful in reducing mortality and decreasing lesion incidence of poultry exposed to Marek's disease.

RELATION TO OTHER APPLICATIONS

This application is a continuation-in-part application of U.S. Ser. No. 51,341, filed June 30, 1970, now abandoned.

SUMMARY OF THE INVENTION

New substituted sulfaguanidines of the following formulas

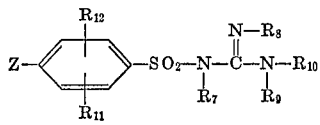

wherein Z is a substituted amino moiety having the following structure

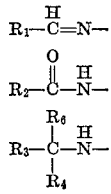

wherein $R_1$ is dialkylamino, or a phenyl group, or a heterocyclic 5–6 membered ring having 1–3 hetero atoms, preferably S, O, or N; either the phenyl or the heterocyclic group having 0–2 substituents, the substituents being —NO$_2$, fluoro, carboxyl, alkoxy, alkylthio, hydroxy, or combinations thereof, including chloro in combination with any of the desired substituents;

$R_2$ is a cycloalkyl having 3–8 carbon atoms, higher alkyl having 10–20 carbon atoms, fluorinated loweralkyl, or a heterocyclic 5–6 membered ring containing 1–3 hetero atoms, preferably O, S, or N; loweralkoxy, haloloweralkoxy, alkoxyloweralkoxy, alkylthio, alkylamino, dialkylamino, aminoalkyl, alkylthioalkoxy, or an aminohydrocarbyl fragment as hereinafter defined; and $R_3$ is NaSO$_2$—

NaSO$_3$—

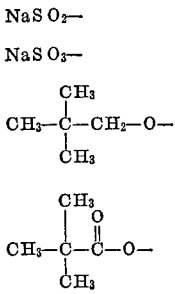

Alkyl—S—

HOOC—CH$_2$—S—

HOOC—CH(NHCOCH$_3$)CH$_2$—S—

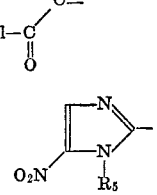

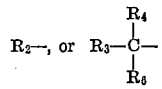

and $R_4$ is hydrogen, loweralkyl or loweralkoxy; $R_5$ is hydrogen or loweralkyl; and $R_6$ is hydrogen, the dotted line indicating that $R_6$ is not present when $R_3$ is attached to C with a double bond; and $R_7$ or $R_{10}$ can each be either hydrogen, $$R_2\text{—, or } R_3\text{—}\underset{R_6}{\overset{R_4}{\underset{|}{\overset{|}{C}}}}\text{—}$$

where $R_2$, $R_3$, $R_4$, and $R_6$ have the same meaning as above; and $R_8$ or $R_9$ can be hydrogen or loweralkyl having 1–6 carbon atoms; or $R_7$ and $R_9$ together or $R_8$ and $R_{10}$ together are an alkyl ring, —(CH$_2$)$_{2-5}$; and $R_{11}$ and $R_{12}$ can be the same or different, and are each hydrogen, halogen, hydroxy, loweralkoxy, amino, alkylamino, dialkylamino, alkanoylamino, benzoylamino, nitro, cyano, loweralkyl, haloloweralkyl, alkylthio, thiol, ureido, thioureido, akoxycarbonylamino, or alkylthiocarbonylamino.

In addition, sulfaguanidines as above are provided where Z is

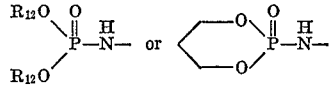

where each $R_{12}$ is alkyl having 1–6 carbon atoms or hydrogen. Additionally, Z can also be haloloweralkyl, sulfonamido, such as difluoromethylsulfonamido, or trifluoromethylsulfonamido; alkylamino, dialkylamino, or diloweralkyltriazo, represented by the formula (loweralkyl)$_2$N—N=N The following additional novel substituted sulfaguanidines

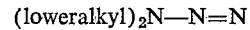

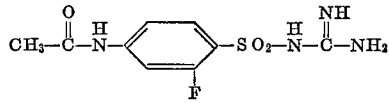

wherein Y is hydrogen, —NO$_2$—, halogen, carboxyl, or alkoxy,

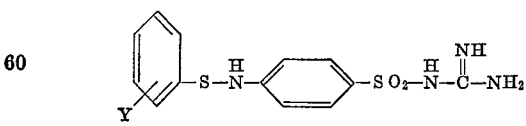

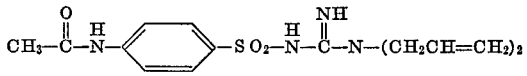

are also provided. Molecular complexes, non-toxic salts and alcohol solvents are also covered within the ambit of this invention. The sulfaguanidines are useful in reducing mortality and decreasing lesion incidence of poultry exposed to Marek's disease. In addition to the new compounds, compositions comprising the new sulfaguanidines as the active ingredient are provided.

By the term "aminohydrocarbyl fragment" is meant that $R_2$ is a portion of an amino acid. For instance, if

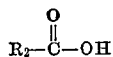

represents an amino acid, the following amino acids can be used to make compounds of this invention. These amino acids are: glycine, alanine, valine, leucine, isoleucine, phenylalanine, typosine, proline, hydroxyproline, serine, threonine, cysteine, cystine, methionine, tryptophane, aspartic acid, glutamic acid, argenine, lycine, or histidine. The corresponding portion of the amino acid is $R_2$ in the novel diphenyl sulfone. For example, in the case of glycine:

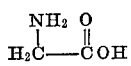

represents the amino acid, and $R_2$ is therefore

or aminomethyl. One skilled in the art will easily identify the corresponding $R_2$ "aminohydrocarbyl fragment" in the listed amino acids.

Marek's disease is a highly infectious lymphoproliferative disorder of poultry, especially chickens. Marek's disease has also been known as neural leukosis, neuralymphomatosis, acute avian leukosis, and skin leukosis. The causative agent(s) are viral with a cell associated Herpes-type virus definitely implicated as an etiological factor. Marek's disease usually is clinically evident in birds prior to sexual maturity, i.e., before the first egg is laid. Clinical manifestations may be one or more of these signs: regional or generalized paralysis, diarrhea with fecal staining of posterior abdominal feathers, weight loss, dyspnea, blindness, enlarged abdomen, or death.

The lesions evident are non-necrotic and include one or more of the following: lymphocytic infiltrated peripheral nerves and/or feather follicles, lymphoproliferative foci, microscopic to several mm. in size, within any tissue of the body but principally within the liver, spleen, kidney, gonads, heart, proventriculus, breast muscle, skin, and nerves.

Marek's disease is estimated by the U.S. Department of Agriculture to cause $200 million annual loss to the U.S. poultry industry. This loss is due to mortality and to the rejection of slaughtered bird carcasses as being unfit for human consumption. This rejection is due to the presence of the lymphoproliferative foci.

OBJECTS OF THE INVENTION

It is an object of this invention to provide novel sulfaguanidine compounds which have utility as agents useful in the treatment of poultry exposed to Marek's disease. It is a further object of this invention to provide a composition, which when administered orally to poultry, reduces mortality and decreases lesion incidence of poultry exposed to Marek's disease. It is a further object of this invention to provide a composition containing a specific level of novel sulfaguanidine compounds which accomplishes the positive relief without adverse effects of residue or toxicity. It is a still further object of this invention to provide a composition containing novel sulfaguanidine compounds which promote the growth of poultry when orally administered. It is yet another object of this invention to provide a new veterinary use for novel sulfaguanidine compounds as a growth promotant of poultry. Other objects of the invention will be apparent upon further reading.

PREFERRED ASPECTS OF THE INVENTION

The preferred novel compounds of this invention are those in which

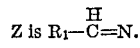

More preferably,

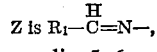

when $R_1$ is the heterocyclic 5-6 membered ring having 1-3 hetero atoms, preferably 1-2 hetero atoms. Most preferably, the hetero ring moiety is one in which there are two hetero atoms, one nitrogen and one sulfur. The optimum compound is the $N^4$-thiazolylidene-substituted sulfaguanidine. Other most preferable compounds include the $N^4$-thenylidene-substituted sulfaguinidine, and the $N^4$-pyridylidene-substituted sulfaguanidine. Other preferred heterocyclic moieties can be isothiazolyl-, pyrrolyl-, imidazolyl-, pyrazolyl-, pyridyl-, pyrazinyl-, pyrimidinyl-, pyridazinyl-, thienyl-, and others. When $R_1$ is a 5-6 membered heterocyclic ring having 1-3 hetero atoms, the hetero atoms are preferably N, S, or O. These rings are all known in the literature, see, for instance, the ACS monograph, *The Ring Index*, 2nd Edition, 1960. Five membered rings having 1-3 hetero atoms are, for instance, furan, thiophene, pyrrole, dioxole, dithiole, pyrazole, oxathiole, thiazole, oxazole, trioxole, trithiole, triazole, dioxathiole dioxazole, oxadithiole, dithiazole, oxadiazole, thiadiazole, or oxathiazole, and isomers thereof. Six membered rings having 1-3 hetero atoms include pyran, thiapyran, pyridine, dioxin, dithiin, pyrimidine, oxathiin, thiazine, oxazine, trioxane, trithiane, triazine, dioxathiane, dioxazine, oxadithiin, dithiazine, oxadiazine, thiadiazine, or oxathiazine and isomers thereof. These heterocyclic rings can all have 0-2 substituents on the rings, the substituents being —$NO_2$, fluoro, carboxyl, alkoxy, alkylthio, hydroxy, or combinations thereof, including chloro in combination with any of the listed substituents.

Another group of preferred compounds of this invention are those in which $R_1$ is a phenyl group. The phenyl group can have 0-2 substituents, the substituents being —$NO_2$, fluoro, carboxyl, alkoxy, alkylthio, hydroxy, or combinations thereof, including chloro in combination with any of the listed substituents. The substituent(s) can be located anywhere on the phenyl moiety. The most preferred group is fluoro. By the term "alkylthio" is meant a loweralkylthio group having 1-6 carbon atoms. The optimum compound is $N^4$-(4-fluorobenzilidene)sulfaguanidine. Other preferred compounds include $N^4$-(p-methylthiobenzilidene)sulfaguanidine and $N^4$-(5-chloro-2-hydroxybenzilidene)sulfaguanidine.

Another group of preferred compounds of this invention are those in which

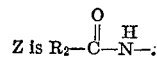

More preferably, $R_2$ is a fluorinated loweralkyl group, loweralkyl having 1-6 carbon atoms. The term "fluorinated" means that the alkyl group can have one or all of its hydrogen atoms replaced by a fluoro-group. The optimal compound is a $N^4$-trifluoroacetyl sulfaguanidine.

Yet another group of preferred compounds when

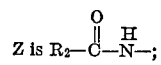

are those in which $R_2$ is a cycloalkyl group having 3-8 carbon atoms. Included are the cyclopropyl, cyclobutyl, cyclopentyl, cyclohexyl, and cyclooctyl moieties.

Still another group of preferred compounds, when

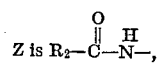

are those in which $R_2$ is a heterocyclic 5-6 membered ring containing 1-3 hetero atoms. The hetero atoms are chosen from O, S, or N. Suitable heterocyclic groups are as listed supra, in the discussion of $R_1$. Preferred heterocyclic moieties are furan, pyrrole, pyran, and pyridine. Most preferred is the $N^4$-(furoyl)sulfaguanidine.

Yet other preferred compounds in this series

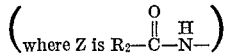

are those where $R_2$ is higher alkyl having 10-20 carbon atoms, such as decyl, undecyl, dodecyl, tridecyl, tetradecyl, pentadecyl, hexadecyl, heptadecyl, octadecyl, nonadecyl, and eicosyl; or $R_2$ is alkoxy, haloalkoxy, alkoxyalkoxy, alkylamino, dialkylamino, aminoalkyl, alkylthioalkoxy, or alkylthio. The term alkyl or alkoxy is generally employed to mean a group containing 1-6 carbon atoms. Most preferably, alkoxy is used to mean a group having 2-4 carbon atoms. Preferred species within these groups include ethoxyethoxy, trichloroethoxy, n-butoxy, and ethylthio. Other species include methoxyethoxy, propoxymethoxy, trifluoroethoxy, propylthio, ethoxy, butylamino, methylethylamino, aminopropyl, propylthioethoxy, and others.

A third major group of compounds of this invention are those in which Z is

This class of compounds is generally termed "substituted methylene," with reference to the carbon attached to the $N^4$-nitrogen of the sulfaguanidine. The $N^4$-substituted methylene group can have hydrogen, an alkyl or an alkoxy group on it, in addition to the $R_3$ moiety. Preferably, the $R_4$ substituent is hydrogen or methyl. When $R_3$ is a nitroimidazolyl moiety, the nitroimidazole can be substituted at $R_5$ with hydrogen or loweralkyl. Preferably $R_5$ is hydrogen, methyl, or ethyl.

In addition to the groups of compounds above, three other novel sulfaguanidines are provided in this invention. These compounds are N-p-acetamidobenzenesulfonyl-N', N' - diallylguanidine, $N^4$ - (2-nitrophenylsulfenyl)-sulfaguanidine, and $N^4$-acetyl-2-fluorosulfaguanidine. In addition to $N^4$-(2-nitrophenylsulfenyl)sulfaguanidine, other substituted phenylsulfenyl groups can be used. The substituents on the phenyl moiety can be hydrogen, $NO_2$—, halogen, carboxyl, or alkoxy, and can be located on any available position of the ring.

It is apparent that soluble non-toxic salts of all of the above compounds and alcoholate solvates of the compounds are also included within the scope of the invention.

The novel sulfaguanidines of this invention are generally prepared by a condensation reaction of sulfaguanidine with an appropriate reactant. To prepare compounds of the type when

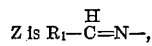

an aldehyde having the formula $R_1CHO$ is employed. The reactants are used in approximately equimolar quantities and mixed in a suitable organic solvent, such as ethanol, methanol, propyl alcohol, isobutyl alcohol, and others. Generally, any polar organic solvent which will not participate in the reaction is preferred. The reactants are mixed with slight heating, i.e., from 30-150° C., preferably from 30-100° C., for from ½-20 hours. The crude product is collected as a precipitate and purified.

When

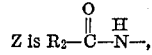

the corresponding

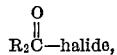

preferably chloride, is used. When the $R_2$ group does not contain an oxygen or sulfur atom linked directly to the —C=O functionality, this reactant can generally be described as the acid halide or chloride, and the corresponding acid anhydride is also suitable.

When the $R_2$ group does contain an oxygen or sulfur atom linked to the —C=O functionality, the appropriate reagent is properly called an $R_2$-ester of haloformic acid, preferably chloroformic acid. For some $R_2$ groups, for instance, the alkoxyalkoxy or the alkylthioalkoxy groups, a different method of preparation is employed. The compound in which $R_2$ is an alkylthiol group is first prepared by reaction with that ester of a haloformic acid in which $R_2$ is an alkylthiol group. This product is then treated with the alkoxyalkanol of appropriate structure to obtain the desired alkoxyalkoxy group as $R_2$. This ester exchange technique, or displacement reaction, is preferably run in the presence of a weakly basic catalyst such as dibutyltinoxide, aluminum isopropoxide, or pyridine triethylamine at temperatures from 50-180° for ½ to 24 hours. When $R_2$ is an "aminohydrocarbyl fragment," the reactive moiety is the chosen amino acid.

Whether the acid halide, acid anhydride, amino acid or the chloroformic acid ester are used, these reactants are each employed in approximately equimolar quantities with the sulfaguanidine. A solvent is employed, for instance, acetone, N,N-dimethylformamide, pyridine, trifluoroacetic anhydride and others. The temperature of the reaction can be from ambient to 150° C., and is preferably at room temperature to 90° C. The product can generally be recovered as a solid precipitate, or by evaporation of the solvent. The reaction goes to completion within 30 minutes to 20 hours.

When the final sulfaguanidine compound contains one or more ring substituents, the process used employs a substituted sulfanilyl chloride in reaction with guanidine. For instance, 2-fluoro-N-acetyl sulfanilyl chloride can be used in reaction with gaunidine. The reactants are mixed in approximately equal molar properties, in a solvent such as ethanol, methanol, tetrahydrofuran, or the like, and mixed at temperatures ranging from 20-125° C. The appropriately substituted sulfanilylchlorides are either available commercially or can be easily synthesized using chemical processes readily apparent to one skilled in the art. Certain of the substituents, for instance, hydroxy, ureido, or amino, should be blocked by a removable functionality before reaction with the guanidine portion. The blocking group could then be removed as the last step of the reaction. Certain of the substituents, i.e., alkylamino, dialkylamino, alkanoylamino, benzoylamino, ureido, alkoxycarbonylamino, and alkylthiocarbonylamino are derivatives of an amino moiety and can be formed from the amino group at any convenient stage of the synthesis.

When $R_7$ and $R_9$ or $R_8$ and $R_{10}$ are together, an alkyl ring structure as defined, that is, —$(CH_2)_{2-5}$—, the compounds are formed by the reaction of the appropriate sulfanilyl chloride with an amino-heterocyclic compound. For instance, when $R_7$ and $R_9$ are —$(CH_2)_3$—, the reactive compound is

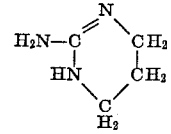

a 2-amino-1,3-diazine. When $R_3$ and $R_{10}$ are —$(CH_2)_3$—, the reactive compound is also the same 2-amino-1,3-diazine. Reaction conditions are chosen such that the reaction in the first instance takes place at the nitrogen in position 1 of the diazine to form a link between $R_7$ and $R_9$. In the second instance, the nitrogen of the 3-amino group is the major reactive locus to create the link between $R_8$ and $R_{10}$.

When Z is haloloweralkylsulfonamido, the appropriate haloloweralkanesulfonylhalide or anhydride is reacted with the p-amino group of the sulfaguanidine.

When Z is alkylamino or dialkylamino, the appropriate alkylhalide is used to react with the p-amino group of the sulfaguanidine.

When Z is a diloweralkyltriazo group, the p-amino group of the sulfaguanidine is first diazotized, then reacted with a diloweralkylamine.

The molecular complexes, alcohol solvates, and non-toxic salts of the described sulfaguanidine derivatives are also active compounds within the meaning of this invention. These can be prepared by ones skilled in the art using presently available knowledge and techniques.

The compound, $N^4$-(2-nitrophenylsulfenyl)sulfaguanidine is prepared, generally as discussed above, by reacting 2-nitrophenylsulfenyl chloride with sulfaguanidine. Other substituted phenylsulfenyl chlorides can also be used to produce the desired Y group substituent.

The compound $N^4$-[methoxy-(1-methyl-5-nitroimidazo-2-yl)-methyl]sulfaguanidine is prepared by reacting 1-methyl-5-nitroimidazole-2-carboxaldehyde with sulfaguanidine, followed by reaction of the thus prepared anil with methanol. The latter reaction is accomplished by dissolving the anil in the alcohol to produce the desired alkoxy group on the methylene carbon.

The compound $N^4$-(1'-carboxyl-1'-acetylaminoethylthiomethyl)sulfaguanidine is prepared by reacting sulfaguanidine, N-acetyl-L-cysteine and formaldehyde in an acidic alcohol solution. The preferred solvent is ethanol. After treatment with sodium, the compound is recovered as the sodium salt.

The compound $N^4$-(carboxymethylthiomethyl)sulfaguanidine is prepared by reacting mercapto acetic acid, formaldehyde, and sulfaguanidine in an acidic alcohol solution. Generally speaking, $N^4$-(sulfa-substituted-methylene) compounds can be prepared by reacting sulfaguanidine, formaldehyde, and the desired organic compound which contains both a mercapto and a carboxylic acid functionality. When the desired $R_3$ group is alkyl-S-, the desired organic compound employed has only the mercapto functionality. Analogous oxygen compounds are used in the preparation of compounds in which $R_3$ is

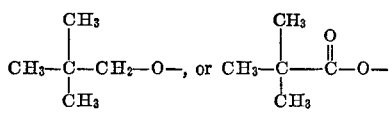

The three reactants are employed in approximately equimolar amounts and are reacted at a temperature ranging from 20–135° C. for from ½–48 hours.

The compound $N^4$-methanesulfinic acid sulfaguanidine, sodium salt, is prepared, by reacting sodium formaldehyde sulfoxylate dihydrate with sulfaguanidine in an acidic alcohol solution, in generally equal molar amounts. An analogous method is used to prepare the $N^4$-methanesulfonic acid sulfaguanidine, sodium salt.

The compound N-p-acetamidosulfonyl-N,N'-diallylguanidine is prepared by reacting N-acetyl sulfanilyl chloride and N,N-diallylguanidine. The reactants are employed in generally equimolar amounts. A basic solvent or a solvent containing added base is employed, such as sodium hydroxide in acetone. The reaction temperature is between 0–50° C. and the reaction time is from ½–12 hours.

The compound N-p-acetamidosulfonyl-N',N'-diallylguanidine is prepared by reacting sulfaguanidine and 2,4-pentane dione. A solvent such as methanol, ethanol, or tetrahydrofuran is employed, and the reactants are heated at 50–100° C. for 2–5 hours in approximately equal molar amounts. The other $R_3$ groups which contain both keto moieties and unsaturation are prepared from the respective diones or triones.

Compounds in which Z is a phosphorus acid-containing moiety are prepared by condensing sulfaguanidine and the appropriate phosphorus acid in a suitable solvent in approximately equimolar amounts. Reaction of the phosphorus acid with the $N^4$-amino group can be assured by selectively blocking the other reactive amino functionalities, and subsequently removing them or by choice of reaction conditions such that substantially 1:1 reaction at the $N^4$-nitrogen is achieved.

In addition, the sulfaguanidines of this invention which have defined substituents at $R_7$, $R_8$, $R_9$, or $R_{10}$ can be prepared by reacting the appropriately substituted sulfaguanidine with any of the reactants described above. In addition, an appropriately substittued guanidine could be reacted with the desired sulfanilyl chloride.

Novel sulfaguanidines of the type disclosed above are effective in the treatment and control of Marek's disease. The compounds' effectiveness is tested *in vivo* by employing chickens which have been infected with virus containing lymphoblasts originally obtained from a chicken with a typical case of Marek's disease. The test procedure is as follows: Athens-Canadian (A–C) random bred chicks, in groups of five each, were placed in cages with wire floors. They were fed *ad libitum* a standard poultry ration in which concentrations of the sulfaguanidines were blended just prior to use. Normal and infected control birds were fed basal ration containing no test compound. After 24 hours on medication, the chicks were injected with a challenge inoculum of Marek's disease virus. The inoculate was originally obtained from a typical field case of Marek's disease in commercial broilers. The inoculate characteristically produces lymphoid tumors of the liver, spleen, kidney, and gonads.

The oral medication in the feed is continued throughout the experiment as a stated percentage of the diet. After an appropriate experimental period, wherein over 50% of the non-medicated infected controls succumb, all surviving birds are sacrificed, All dead and sacrificed birds are autopsied and lesion incidence recorded.

In accordance with this invention, the novel sulfaguanidines are employed for controlling Marek's disease by administering them to poultry susceptible or exposed to the disease, either in the drinking water, feed, or parenterally. The preferable mode of administration is orally, either in the drinking water or feed.

It is most preferred to disperse the sulfaguanidine in the finished feed of the animals, and to administer the medicated feed *ad libitum* to the birds. Good results against Marek's disease are achieved with feedstuff containing from about 0.002% to 0.1% by weight of the drug. Drug levels can also operably be from 0.0002% to 0.2% in the feed. The preferred range is between 0.01% to 0.1% in the feed. Levels in poultry feed are here expressed in terms of percent by weight concentration.

The higher levels may be used in treating an established outbreak of Marek's disease, but the higher dosages are not preferred for prophylactic treatment where medicated feed is given continuously to the poultry. It will be appreciated by those skilled in this art that these low levels will eliminate any toxicity or residue problems which result from feeding of high levels of sulfaguanidine.

The finished feed in which the above-described levels of the novel sulfaguanidines are employed is a nutritionally adequate one containing sources of carbohydrate, protein, fat, vitamins, minerals and other nutritional factors commonly employed in commercial poultry raising. In addition, other poultry feed additives such as coccidiostats, e.g., amprolium, ethopabate, nicarbazin, can be employed in the compositions.

In addition to administration via the solid feedstuff, sulfaguanidines can be administered to poultry by incorporation in the drinking water. The preferred dose levels in the drinking water are usually somewhat less than those employed in a solid feed inasmuch as poultry drink about twice as much as they eat. The operable level in drinking water is from 0.0001% to 0.1% by weight of the sulfaguanidine compound and the preferred range is 0.005% to 0.1% by weight. Administration via the drinking water is of advantage when using the compound therapeutically rather than prophylactically. For this purpose it is convenient to prepare dispersible or water-soluble powders in which the sulfaguanidines are intimately dispersed in a suitable water-soluble or dispersible liquid or solid carrier such as dextrose, sucrose, dimethyl sulfoxide, or other suitable non-toxic carriers, at concentrations of from about 0.03% to about 25% by weight. These solids may then be conveniently added to the drinking water by the poultry grower.

A typical drinking water formulation contains $N^4$-(4-fluorobenzilidene) sulfaguanidine, 0.3%; 1-(2-n-propyl-4-amino - 5 - pyrimidinyl - methyl) - 2 - methyl pyridinium chloride hydrochloride, 9.6%; dextrose, 30%; propylene glycol, 20%; methylpolysiloxane, 0.002%; polyoxyethylene sorbitan monoleate, 0.2%; water, to 100%.

According to a further aspect of this invention, there are provided compositions comprising poultry feed supplements or additives containing the sulfaguanidines previously described as an effective Marek's disease agent. In such compositions the compound is mixed with or dispersed in an orally ingestible carrier vehicle that is non-toxic to the poultry and compatible with the finished feedstuff. These feed supplements contain a significantly higher percentage of the novel sulfaguanidine compounds than does the finished feed, and are mixed with or blended into the feedstuff before administration to the poultry. In order to assure uniform distribution of the compound in the finished feed, it is customary to employ an intermediate dilution step in which the supplement is blended with a portion of the final feed, and this "intermediate mix" is then added to the remainder of the feed with adeqaute mixing. The sulfaguanidines described hereinabove may be formulated into feed supplement compositions containing from about 0.05% to about 50% by weight of drug. It is preferred in the industry to use from about 1–5 pounds of such a supplement per ton of feedstuff. It will, therefore, be appreciated that the preferred supplement concentration will depend to a large extent on the final use level desired. With the compounds of this invention, feed supplement compositions containing from about 1.0% to about 20% by weight of active ingredient are preferred.

Diluent or carrier vehicles that may be used in these poultry feed supplements are solid orally ingestible poultry feed additives such as corn meal, distillers' dried grains, ground oyster shell, citrus meal fermentation residues, wheat shorts, wheat middlings, molasses solubles, corn gluten feed, soybean meal, dehulled soya flour, crushed limestone, fermentation mycelia, edible vegetable substances and the like. Nutritive carriers are preferred since the finished feed is benefitted thereby.

This invention is more fully described in the following examples.

EXAMPLE 1

$N^4$-(2-Nitrophenylsulfenyl)sulfaguanidine hydrochloride

A mixture of 4.28 g. of sulfaguanidine, 3.78 g. of 2-nitrophenylsulfenylchloride, and 2.12 g. of sodium bicarbonate is stirred 2 hours in 125 ml. of acetone. The precipitate is collected, washed with water and acetone, and recrystallized from methanol to give 860 mg. of product, $N^4$-(2-nitrophenylsulfenyl)sulfaguanidine hydrochloride, M.P. 210–212° C.

EXAMPLE 2

$N^4$-[Methoxy-(1-methyl-5-nitroimidazo-2-yl)-methyl] sulfaguanidine

A mixture of 15.0 g. of sulfaguanidine and 10.0 g. of 1-methyl-5-nitromidazole-2-carboxaldehyde are warmed briefly on a steam bath in 225 ml. of ethanol. The reaction mixture is then concentrated to a gum and chromatographed on 400 g. of silica gel using 4:1 chloroform:methanol as an eluant. Three liters of eluant gives 20 g. of gum, which is then dissolved in 300 ml. of methanol. From the methanol solution, 12 g. of product, $N^4$-[methoxy - (1 - methyl - 5 - nitroimidazo-2-yl)-methyl]sulfa- guanidine, can be recrystallized having a melting point of 153–156° C.

EXAMPLE 3

$N^4$-(1'-carboxy-1'-acetylaminoethylthiomethyl)sulfaguanidine, sodium salt

A mixture of anhydrous sulfaguanidine (6.45 g.), absolute ethanol (100 ml.), 37% formalin (4.5 ml.), N-acetyl-L-cystein (5.5 g.), and 10 drops of concentrated hydrochloric acid is stirred at 25°. A clear solution is obtained after stirring approximately one hour. After stirring for one more hour, a colorless syrup separates from the solution. The supernatant is decanted and is treated with a solution prepared from 1.5 g. of sodium metal in 50 ml. absolute ethanol. The resulting precipitate is filtered, washed with ethanol, and dried *in vacuo* to yield 7.0 g. of product, $N^4$-(1'-carboxyl-1'-acetylaminoethylthiomethyl)sulfaguanidine, sodium salt. Analysis and intra-red and NMR spectra are consistent with the assigned structure.

EXAMPLE 4

$N^4$-(Carboxymethylthiomethyl)sulfaguanidine

To 4.64 g. (0.02 mole) of sulfaguanidine monohydrates suspended in 66 ml. of absolute ethanol are added 3.0 ml. of 36% formaldehyde solution, 1.66 ml. of mercapto acetic acid and 6 drops of concentrated hydrochloric acid. The mixture is stirred at room temperature for three days. The crystalline product is collected and washed with ethanol and acetone. The crude product weighs 5.1 g. and has a M.P. 188–190° (dec.). It is recrystallized from methanol to give 2.5 g. of purified product, $N^4$ - (carboxymethylthiomethyl)sulfaguanidine, M.P. 188–192° (dec.).

EXAMPLE 5

Sulfaguanidine-$N^4$-methanesulfinic acid, sodium salt, ethanolate

A mixture of 4.64 g. (0.02 mole) of sulfaguanidine monochydrate and 3.08 g. (0.02 mole) of soduim formaldehyde sulfoxylate dihydrate is added in 15 minutes with stirring to 15 ml. of glacial acetic acid. After ½ hour, there is almost complete solution. To the solution is added gradually 150 ml. of ethanol. A solid product separates. Diethylether is then added in excess to the mixture, causing additional solid to precipitate. The colorless precipitate is collected and washed well with ether. After drying in vacuum oven at 45°, the crude colorless product weighs 6.7 g. A portion, 3.3 g., is dissolved in 5 ml. of water. Some solid sodium bicarbonate is added. To this slightly basic solution is added 7 ml. of ethanol; a slight amount of solid material separates and is removed by filtration and discarded. To the filtrate 1 ml. of water is added, followed by the addition of 15 ml. of ethanol. A solid which separates is removed by filtration. To the filtrate is added 10 ml. of ethanol. Crystals begin to separate. Finally 50 ml. of ethanol is added with stirring and scratching. The colorless crystaline product is collected and washed with ethanol. After drying in vacuum oven at 45°, the salt weighs 1.2 g., M.P. 90–110° (dec.). Elementary analytical data as well as NMR spectral data shows the desired product contains an equivalent of ethanol. The product is identified as sulfaguanidine-$N^4$-methanesulfinic acid, sodium salt, ethanolate.

EXAMPLE 6

N-p-acetamidobenzenesulfonyl-N',N'-diallylguanidine

To a suspension of 8.48 g. of N,N-diallylguanidine hydrochloride in 60 ml. of acetone is added a solution of 5.0 g. of sodium hydroxide in 10 ml. of water. The temperature of this mixture is kept below 22° by use of an ice bath and 12.5 g. of solid N-acetyl sulfanilyl chloride is added to the reaction mixture. The reactant mixture is stirred overnight at room temperature. The reaction mixture is diluted with 150 ml. of water and then neutralized with acetic acid. The acetone is removed at reduced pressure causing the separation of an oil which solidified upon standing. Recrystallization from ethanol-water gave the product, N-p-acetamidobenzenesulfonyl-N',N'-diallylguanidine, M.P. 133–134° C.

EXAMPLE 7

$N^4$-(1-methylbutene-3-one)sulfaguanidine

A mixture of 5.0 g. of sulfaguanidine and 3.0 g. of 2,4-pentanedione are heated in the steam bath for 15 hours in 100 ml. of methanol. On cooling 2.7 g. of precipitate separated and is collected. Recrystallization from methanol gave 2.0 g. of product, $N^4$-(1-methyl-butene-3-one)sulfaguanidine, M.P. 220–222° C.

EXAMPLE 8

$N^4$-($\beta,\beta,\beta$-trichloroethoxycarbonyl)sulfaguanidine

A mixture of 4.28 g. of sulfaguanidine, 4.26 g. of $\beta,\beta,\beta$-trichloroethoxychloroformate and 2.12 g. of sodium bicarbonate are stirred for 15 hours in 125 ml. of acetone. The resultant precipitate is collected and washed with acetone, sodium bicarbonate solution, water, and again with acetone to give 6.5 g. of product, $N^4$-($\beta,\beta,\beta$-trichloro-ethoxycarbonyl)sulfaguanidine, M.P. 255°, (dec.).

EXAMPLE 9

$N^4$-n-butyloxycarbonyl)sulfaguanidine

To a solution of 5 g. of sulfaguanidine in 25 ml. of N,N-dimethylformamide is added 5 ml. of n-butylchloro-formate. The resulting mixture is stirred at room temperature for one hour. A solid precipitates during reaction and is removed by filtration and washed with ether. Recrystallization of the crude product from methanol yields the pure product, $N^4$ - (n-butyloxycarbonyl)-sulfaguandine, M.P. 223–224° (dec.).

EXAMPLE 10

$N^4$-(ethylthiocarbonyl)sulfaguanidine

To a suspension of 55 g. of sulfaguanidine in 250 ml. of N,N-dimethylformamide, 55 ml. of ethylthiochloro-formate is added. The resulting mixture is stirred at room temperature for three hours. The insoluble material is removed by filtration. When the filtrate is diluted with water, a white solid separates. The crude solid is purified by recrystallization from methanol, yielding $N^4$-(ethylthiocarbonyl)sulfaguanidine, M.P. 243–248° (dec.).

EXAMPLE 11

$N^4$-($\beta$-ethoxyethoxycarbonyl)sulfaguanidine

A mixture of 5.0 g. of $N^4$-(ethylthiocarbonyl)-sulfaguanidine as prepared in Example 10 and 500 mg. of dibutyltinoxide in 50 ml. of $\beta$-ethoxyethanol is heated at reflux for 8 hours. Cooling afforded the crude product which is purified by recrystallization from ethanol. The pure product, $N^4$-($\beta$ - ethoxyethoxycarbonyl)sulfaguanidine, has a M.P. of 215–217°.

EXAMPLE 12

$N^4$-Acetyl-2-fluorosulfaguanidine ethanolate

To a mixture of 1.08 g. of guanidine sulfate and 1.6 g. of sodium hydroxide in 50 ml. of tetrahydrofuran and 5 ml. of water, is added 2.52 g. of N-acetyl-2-fluoro-sulfanilyl chloride. The resulting mixture is stirred at room temperature overnight. The reaction mixture is concentrated by evaporation, yielding a crude solid material which is purified by recrystallization from ethanol. The product is obtained as a monoethanol solvate, $N^4$-acetyl-2-fluorosulfaguanidine ethanolate, M.P. 268–270°.

EXAMPLE 13

$N^4$-(Cyclobutanoyl)sulfaguanidine

A mixture of 4.2 g. of sulfaguanidine and 4.00 g. of cyclobutanecarboxylic acid anhydride is heated in 100 ml. of pyridine on a steam bath for 12 hours. The pyridine is then removed in vacuo, and the residue washed with water and ether before recrystallization from methanol. The product, $N^4$-(cyclobutanoyl)sulfaguanidine is recovered and identified and has a melting point of 276–278°.

EXAMPLE 14

$N^4$-(Palmitoyl)sulfaguanidine

A mixture of 4.28 g. of sulfaguanidine and 6.05 g. of palmitoyl chloride are heated 15 hours on a steam bath in 100 ml. of pyridine. The pyridine is removed in vacuo, and the residue purified as in Example 13. The product, $N^4$-(palmitoyl)sulfaguanidine is identified, M.P. 158°.

EXAMPLE 15

$N^4$-(Cyclohexanoyl)sulfaguanidine

A mixture of 4.28 g. of sulfaguanidine and 3.21 g. of cyclohexane carbonyl chloride is heated 15 hours on a steam bath in 100 ml. of pyridine. The pyridine is removed in vacuo and the residue washed with water and ether before recrystallization from methanol. This procedure yields 2.8 g. of product, $N^4$-(cyclohexanoyl)sulfa-guanidine, M.P. 300°.

EXAMPLE 16

$N^4$-(Furoyl-2)sulfaguanidine

To a solution of 4.28 g. of sulfaguanidine in 100 ml. of pyridine is added 2.86 g. of furoyl-2 chloride. The mixture is heated on a steam bath for 30 minutes. After cooling, the precipitate is collected and washed with water, pyridine, and finally ether to yield 2.8 g. of crude solids. This material is recrystallized twice from methanol to give 1.6 g. of pure product, $N^4$-(furoyl-2)-sulfaguanidine, M.P. 265–275°.

EXAMPLE 17

$N^4$-Trifluoroacetylsulfaguanidine

A suspension of 5 g. of sulfaguanidine in 25 ml. of trifluoroacetic anhydride is stirred at room temperature for 3 hours and then filtered to give a crude solid. Purification is accomplished by first washing with ether and then recrystallizing from methanol-ether to give the pure product, $N^4$-trifluoroacetylsulfaguanidine, M.P. 258–260°.

EXAMPLE 18

$N^4$-Cyclopropylcarbonylsulfaguanidine

To 4.28 g. (0.02 mole) of sulfaguanidine, anhydrous, suspended in 30 ml. of dry pyridine is added 2.08 g. (0.02 mole) of cyclopropane carboxylic acid chloride. The solution is stirred at room temperature for 3 hours. A crystalline precipitate is separated by adding water mixed with 25 ml. of concentrated hydrochloric acid to the chilled reaction mixture. The crude product is collected, washed with water, and oven dried; weight 4.14 g. Crystallization from ethanol yields 2.65 g. of $N^4$-cyclopropyl-carbonylsulfaguanidine, M.P. 249–251° (dec.).

EXAMPLE 19

$N^4$-(p-Methylthiobenzilidene)sulfaguanidine

A mixture of 4.28 g. of sulfaguanidine and 6.08 g. of p-methylthiobenzaldehyde is heated briefly in 150 ml. of ethanol. The resultant precipitate is collected and digested in 700 ml. of methanol. After cooling, 3.5 g. of product, $N^4$-(p-methylthiobenzilidene)sulfaguanidine, is obtained, M.P. 248–250°.

EXAMPLE 20

$N^4$-(Thiazolylidene-4)sulfaguanidine

A mixture of 4.28 g. of sulfaguanidine and 4.48 g. of thiazole-4-carboxaldehyde are refluxed for 15 hours in 150 ml. of ethanol. An additional 4.28 g. of the aldehyde is added and refluxing is continued for 5 hours. After cooling, 3.3 g. of product, $N^4$-(thiazolylidene-4)sulfa-guanidine, is collected and purified, M.P. 255–256°.

EXAMPLE 21

N⁴-(Pyridylidene-3)sulfaguanidine

A mixture of 4.28 g. of sulfaguanidine and 4.28 g. of 3-pyridinecarboxaldehyde is refluxed for 15 hours in 150 ml. of ethanol. The solvent is removed *in vacuo* and the residue washed with ether. Recrystallization from 100 ml. of acetone gives 2.35 g. of material. After additional washing with acetone, 1.5 g. of product is collected. The product is identified as N⁴-(pyridylidene-3)sulfaguanidine, M.P. 199–202°.

EXAMPLE 22

N⁴-(Thenylidene-2)sulfaguanidine

A mixture of 6.3 g. of thiophene-2-carboxaldehyde and 8.0 g. of sulfaguanidine are heated on a steam bath for 25 minutes in 200 ml. of ethanol. After cooling the crude precipitate is collected on a filter. The crude product is purified and identified as N⁴-(thienylidene-2)sulfaguanidine, m.p. 231–234°.

EXAMPLE 23

N⁴-(5-Chloro-2-hydroxybenzilidene)sulfaguanidine

A mixture of 5.00 g. of sulfaguanidine and 5.5 g. of 5-chlorosalicylaldehyde is boiled in 250 ml. of ethanol for 10 minutes. The resultant precipitate is collected and washed with ethanol to give 7.3 g. of product, N⁴-(5-chloro-2-hydroxybenzilidene)sulfaguanidine, m.p. 252–255°.

EXAMPLE 24

N⁴-(4-Fluorobenzilidene)sulfaguanidine

A mixture of 4.28 g. of sulfaguanidine, 4.0 g. of p-fluorobenzaldehyde and 150 ml. of ethanol is heated on the steam bath overnight. After cooling, 4.6 g. of solid is collected. Recrystallization from methanol gives 2.7 g. of product identified as N⁴-(4-fluorobenzilidene)-sulfaguanidine, m.p. 200–203°.

What is claimed is:

1. A compound having the formula:

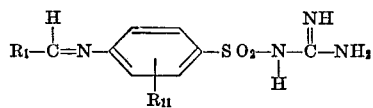

wherein $R_1$ is the heterocyclic ring thiophene, thiazole, or pyridine, having 0–2 substituents, said substituents being nitro, fluoro, carboxyl, loweralkoxy, loweralkylthio, hydroxy, chloro, or combinations thereof, and $R_{11}$ is hydrogen.

2. The compound of Claim 1 in which $R_1$ is thiazolyl.
3. The compound of Claim 2 which is N⁴-(thiazolylidene-4)-sulfaguanadine.
4. The compound of Claim 1 in which $R_1$ is thienyl.
5. The compound of Claim 4 which is N⁴-(thienylidene-2)-sulfaguanidine.
6. The compound of Claim 1 in which $R_1$ is pyridyl.
7. The compound of Claim 6 which is N⁴-(pridylidene-3)-sulfaguanidine.

References Cited

UNITED STATES PATENTS 2,393,271  1/1946  Shelton _____ 260—397.7

HENRY R. JILES, Primary Examiner

R. T. BOND, Assistant Examiner

U.S. Cl. X.R.

260—239.8, 239.95, 397.7, 239.75, 239.9, 240 G, 401; 424—228, 229